3,141,818
Patented July 21, 1964

1

3,141,818
BIOLOGICAL TOXICANT
John A. Stephens and Erhard J. Prill, St. Louis, Mo., assignors to Monsanto Company, a corporation of Delaware
No Drawing. Original application Jan. 29, 1959, Ser. No. 789,799. Divided and this application Oct. 24, 1962, Ser. No. 232,862
2 Claims. (Cl. 167—30)

This invention relates to α-thiocyanatoalkyl esters of aromatic carboxylic acids useful as biological toxicant. This application is a division of copending application Serial No. 789,799, filed January 29, 1959.

It is well known in the art that biological toxicant activity is unpredictable. Unexpectedly a group of new compounds which are especially potent microbiological toxicants particularly suitable for industrial preservative use have been found.

It is a primary object of this invention to provide new compounds which are very potent microbiological toxicants especially useful as industrial preservatives.

These and other objects of the invention will become apparent as a detailed description of the invention proceeds.

The new compounds of the invention are α-thiocyanatoalkyl esters of monocyclic aromatic carboxylic acids of the formula

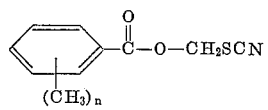

wherein $n$ is an integer from 0 to 2 inclusive. Where $n$ is 1 or 2, the methyl radicals can be in ortho, meta and/or para relationship to each other and the carbon atom of the aromatic ring attached to the carbonyl atom, i.e., such compounds as thiocyanatomethyl o-toluate, thiocyanatomethyl m-toluate, thiocyanatomethyl p-toluate, thiocyanatomethyl 2,3-dimethylbenzoate, thiocyanatomethyl 2,4-dimethylbenzoate, thiocyanatomethyl 2,5-dimethylbenzoate, thiocyanatomethyl 3,4-dimethylbenzoate, thiocyanatomethyl 3,5-dimethylbenzoate. The new compounds of the invention can be made by reacting the corresponding chloromethyl aromatic carboxylic acid ester with an alkali metal thiocyanate.

Actually, broadly speaking, α-thiocyanatoalkyl esters of aromatic carboxylic acids of the formula

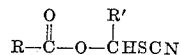

are active biological toxicants, R being an aromatic radical and R' a lower alkyl radical. The preferred compounds are those in which R is a mono- or bicyclic aromatic radical. The aromatic nucleus can be unsubstituted or substituted with lower alkyl radicals, preferably methyl, halogen atoms preferably bromine or chlorine, lower alkoxy radicals, nitro radicals, cyano radicals, thiocyano radicals, etc., or mixtures thereof. It is preferred that not more than 5 substituent groups be contained on the aromatic nucleus. An alternative method of making these compounds is to react an alkali metal salt, e.g., sodium, of an aromatic carboxylic acid with an α-halo, preferably bromo, alkylthiocyanate.

2

The new compounds of the invention are particularly useful for the prevention and control of bacterial infection and of decomposition and decay caused by mildew, molds, and other non-chlorophyll-containing plants. Thus, e.g., the present products can be used for the protection of organic materials subject to deterioration by rotting, such as leather, fur, pulp, paper, textile, rope, rubber, latex plastics, and paint. Incorporation of protective fungistats in such organic materials is especially desirable when they are exposed to conditions favoring microbiological growth. Thus, e.g., the present microbiological toxicants can be used to protect wood buried in ground, as in the case of railroad ties and telephone poles; textiles exposed to dampness, as under tropical conditions or in the case of lawn furniture, awnings, etc.; or they can be used in marine paints and lacquers subject to algal and fungal attack, etc. The present products can also be used as seed protectants and soil sterilants for the suppression of organic organisms harmful to seeds and plants. Additionally the present microbiological toxicants which are active against sulfate-reducing bacteria can be added to oil field injection flood waters for the prevention of pipe plugging caused by hydrogen sulfide releasing bacteria such as *Desulfovibrio desulfuricans*.

The microbiological toxicants of this invention also have a high degree of germicidal activity and compositions containing these products are good disinfectants. Disinfectant compositions containing the present products can be used in the disinfection or sterilization of surgical instruments, dairy equipment, eating utensils and other articles requiring such treatment or in sanitary cleaning solutions to wash walls, floors, etc. When employed in the manufacture of pharmaceutical, cosmetic, edible compositions, the present microbiological toxicants can have both preservative and antiseptic effects.

The thiocyanatomethyl aromatic carboxylates of the invention can be applied directly to the material to be treated, e.g., by incorporation of the compound in a disinfectant soap or antiseptic cream. However, because the present products are effective in extremely dilute concentrations, for most applications it is preferred to incorporate them in a carrier or diluent. The choice of diluent is determined by the use of the composition as is the concentration of the active ingredient in the diluent. Thus, by admixture with an inert pulverulent carrier such as talc, bentonite, kieselguhr, diatomaceous earth, etc., there can be prepared compositions suitable for admixture with seeds, etc., to afford protection from microbiological attack in the soil. Solutions of compounds in organic solvents such as kerosene can be applied as a spray or impregnating bath, if desired, with the use of pressure to facilitate penetration of the solution for treatment of cellulosic materials to produce, e.g., rot-proofing. Suitable formulations for application of the new products to articles subject to microbiological attack are also prepared by mixing the compounds with an emulsifying agent in the presence of organic solvents and then diluting with water to form an aqueous emulsion containing the compound. Suitable emulsifying agents include, e.g., alkylbenzenesulfonates, polyalkylene glycols, salts of sulfated long-chain alcohols, sorbitan fatty acid esters, etc.; other emulsifying agents which can be used to formulate emulsions of the new compounds are listed, e.g., in U.S. Department of Agriculture Bulletin E607. Aqueous emulsions of the microbiological toxicant products of the invention are also particularly suited for use in disinfectant solutions, e.g., to wash floors and walls, or to rinse restaurant ware, etc. In another embodiment of this invention standard paint formulations can be used as a diluent and carrier for the microbiological toxicant compounds of the invention; these products can assist in preventing mold growth in, e.g., casein paints and the paints can also be applied to surfaces which are thereby rendered resistant to the growth of bacteria and fungi. The microbiological toxicants can also be admixed with carriers which are active of themselves, for example with hormones with buffering and/or softening agents, etc.

The invention will be more clearly understood from the following detailed description of specific examples thereof:

Example 1

This example illustrates the preparation of thiocyanatomethyl benzoate. To a flask with a reflux condenser was charged 17 grams (0.10 mole) of chloromethyl benzoate (which can be prepared by light catalyzed chlorination of methyl benzoate as described in U.S. 2,816,134 or by the reaction of benzoyl chloride with paraformaldehyde), 10 grams (0.11 mole) of KSCN and 125 ml. of ethanol. The reactants were heated for about 1 hour at reflux temperature (about 75° C.) and allowed to cool. A white solid, which was KCl, precipitated and was filtered off. The amount of KCl recovered was about 6.4 grams. The filtrate from the filtration was heated under reduced pressure to remove the greater part of the solvent and gave a turbid yellow liquid residue. Upon applying vacuum in the distillation of this liquid residue, the residue solidified to a yellow mass, weighing 18.6 grams and having a melting point of 47–48° C. A sample of 4.7 grams of this crude solidified product was recrystallized from 14 ml. of hexane and 6 ml. of benzene to give light yellow crystals having a softening point of 48° C. and a melting point of 50.5–51.5° C. This partially purified sample was recrystallized again from the same solvent to give a purified product having softening point of 50° C. and a melting point of 51–52° C. A nitrogen analysis of this purified product showed 7.26% nitrogen. Alkaline hydrolysis, then acidification of the product gives benzoic acid, M.P. 121–122° C. This product is thiocyanatomethyl benzoate.

Example 2

For the evaluation of the bacteriostatic and fungistatic effects of these new compounds, the product of Example 1 was chosen for testing, namely, thiocyanatomethyl benzoate. This compound was mixed in predetermined concentrations with hot sterile agar which was subsequently poured into Petri dishes, cooled and allowed to harden. Nutrient agar containing the test compound was then inoculated with the bacteria *Staphylococcus aureus* and *Salmonella typhosa* and incubated for 2 days at 37° C., and Sabouraud's dextrose agar containing the test compounds were inoculated with the fungus organism *Aspergillus niger* and incubated for 5 days at 20° C. These tests showed inhibitions of the Staphylococcus down to 100 parts per million (p.p.m.) concentration of the compound tested, inhibition of the growth of *Salmonella typhosa* down to 10 p.p.m. concentration of the compound tested, and inhibition of the growth of the *Aspergillus niger* down to 1 p.p.m. concentration of the compound tested. Thus, it will be seen that these compounds are extremely potent bacteriostats and fungistats. Usually these novel compounds will be applied as bacteriostats or fungistats at concentrations in the range of 0.0001 to 1.0%, preferably 0.001 to 0.1%, suspended, dispersed or dissolved in an inert carrier, but higher concentrations can be used, if desired; and, in any event, the microbiological toxicant must be present in the toxicant formulation or composition in at least a concentration sufficient to inhibit the growth of the bacteria and/or fungi to which it is being applied, i.e., a microbiologically toxic amount.

To illustrate the wide field of usage of the present bacteriostats and fungistats there is appended below a table showing minimum concentrations of thiocyanatomethyl benzoate inhibiting the growth of various test organisms.

| Bacteriostatic Test Organism | Lowest p.p.m. Inhibiting growth | Fungistatic Test Organism | Lowest p.p.m. Inhibiting growth |
|---|---|---|---|
| *Staphylococcus aureus* ATCC 6538 | 100 | *Aspergillus niger* IPC 144 | 10 |
| *Bacillus cereus* var. *mycoides* IPC 509 | 10 | *Penicillium expansum* IPC 126 | 1 |
| *Bacterium ammoniagenes* ATCC 6871 | 100 | *Fomes annosus* FPL 517 | 1 |
| *Escherichia coli* ATCC 11229 | 10 | *Trichoderma* sp. T-1 ATCC 9645 | 10 |
| *Erwinia atroseptica* ATCC 7404 | 100 | *Ceratostomella pilifera* ATCC 8713 | 10 |
| *Salmonella typhosa* (Hopkins strain) | 100 | *Aspergillus oryzae* ATCC 10196 | 1 |
| *Pseudomonas aeruginosa* QMB 1468 | 1000 | *Myrothecium verrucaria* ATCC 9095 | 1 |
| *Bacillus subtilis* (Lambert) | 1 | *Monilinia fructicola* (U. of Ill.) | 1 |
|  |  | *Lenzites trabea* Madison 617 | 1 |

Not only are the compounds of the invention potent microbiological toxicants but they are generally active as biological toxicants. In tests conducted using the toxicant of Example 1, insecticidal, fungicidal, herbicidal, and nematocidal activity was demonstrated. Thiocyanatomethyl benzoate was especially active against yellow fever mosquito larvae, and was active against all stages of the 2-spotted spider mite as well as showing residual activity against the spider mite in insecticidal testing. Both broad and narrow leaf contact herbicidal activity and pre-emergent herbicidal activity was demonstrated on the testing of this compound. In fungicidal testing several different kinds of fungus were killed by this compound. The thiocyanatomethyl benzoate test compound of the invention also proved to be effective as a nematocide. For use of the compounds of the invention other than as microbiological toxicants, the compounds would in general, be compounded in a manner similar to that for microbiological use except that concentrations of the toxicant would be similar to those conventionally applied for these other uses; but, in any event, the toxicant must be present in the toxicant formulation or composition in at least an amount sufficient to kill the particular biological pest or pests to which it is applied, i.e., a pesticidally effective amount.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. The method of inhibiting the growth of undesired microorganisms which comprises exposing said microorganisms to at least an amount sufficient to inhibit their growth of a compound of the formula

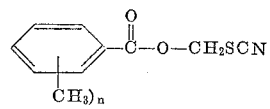

where *n* is an integer of from 0 to 2 inclusive.

2. The method of inhibiting the growth of undesired microorganisms which comprises exposing said microorganisms to at least an amount sufficient to inhibit their growth of thiocyanatomethyl benzoate.

References Cited in the file of this patent

UNITED STATES PATENTS

| | | |
|---|---|---|
| 2,376,105 | Williams | May 15, 1945 |
| 2,433,106 | Flenner et al. | Dec. 23, 1947 |
| 2,617,818 | Mowry | Nov. 11, 1952 |
| 2,620,290 | Searle | Dec. 2, 1952 |
| 2,692,889 | Johnson | Oct. 26, 1954 |
| 2,796,425 | Scalera et al. | June 18, 1957 |
| 2,819,197 | Santmyer et al. | Jan. 7, 1958 |